Oct. 5, 1948.　　　　　M. SCHMID　　　　2,450,566
MOTOR SLED
Filed Aug. 19, 1942
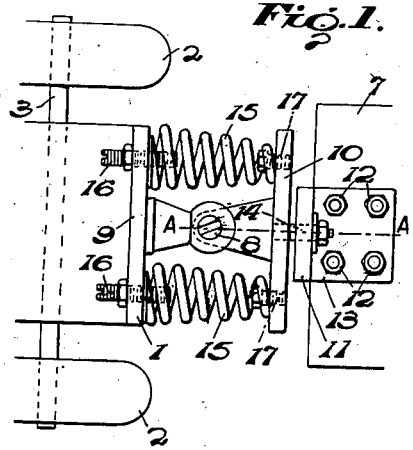
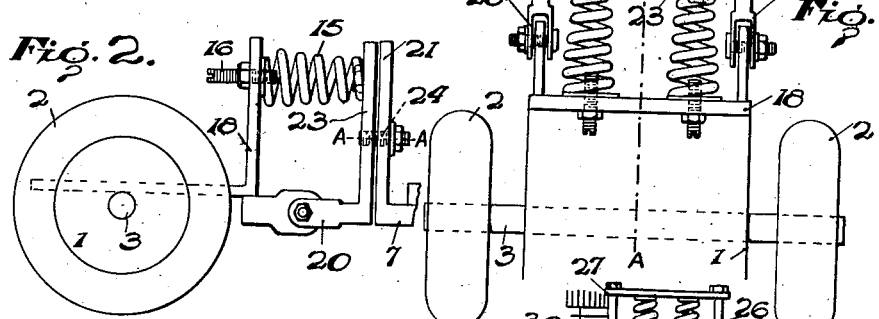
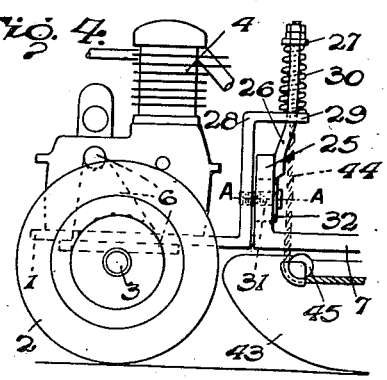
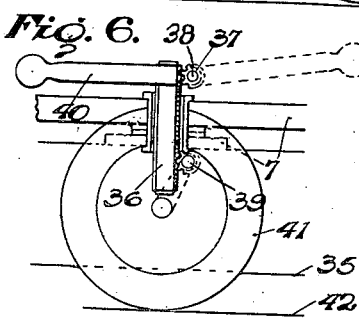
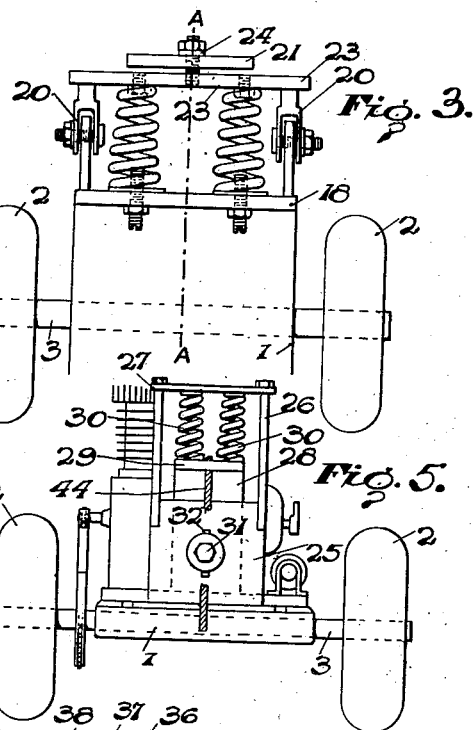
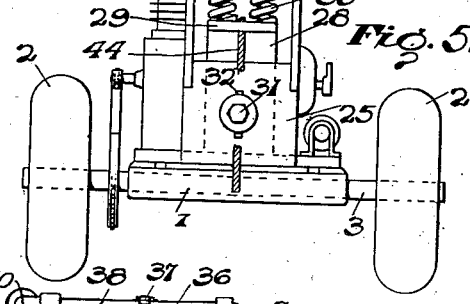
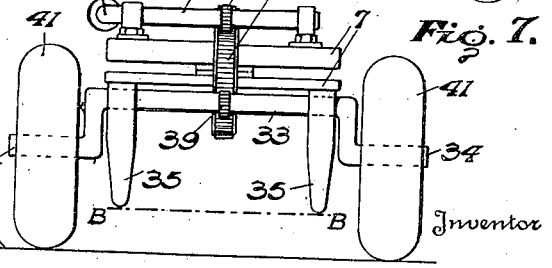
Inventor
Martin Schmid.
By Raymond J. Norton
Attorney Patented Oct. 5, 1948

2,450,566

UNITED STATES PATENT OFFICE 2,450,566

MOTOR SLED

Martin Schmid, Lucerne, Switzerland

Application August 19, 1942, Serial No. 455,371
In Switzerland July 24, 1941

4 Claims. (Cl. 180—6)

The object of the present invention is a motor sled.

It is characterised by a motor mounted on a chassis which is supported on at least two wheels and is coupled to the rear end of the sled itself.

The accompanying drawing illustrates, by way of example, different embodiments of the object of the invention.

Fig. 1 is a top view on a part of an embodiment, without the motor.

Fig. 2 is a side view of a part of a second embodiment.

Fig. 3 is a top view of Fig. 2.

Fig. 4 is a side view of the rear end of a motor driven sled and showing a third embodiment.

Fig. 5 is a front view of the motor chassis with coupling portions, seen from right to left in Fig. 4.

Fig. 6 is a side view of a part of a fourth embodiment, showing the wheels capable of being moved above and below the running surface of the skid runners and fixed to the fore skid runner portion.

Fig. 7 is a front view, seen from right to left in Fig. 6.

On the chassis 1 (Fig. 1) the axle 3 carrying the rubber tires 2 is mounted. This axle may, e. g., be driven with the help of a belt or chain drive 6 or a toothed wheel gear by an explosion motor 4 mounted on the chassis, all as shown in Fig. 4. As shown in Fig. 1 this chassis 1 is coupled to the rear end of the sled 7 itself by means of a ball joint 8 arranged approximately at the same height as the axle 3. The one ball joint portion is fixed to the cross piece 9 of the chassis 1 and the other joint portion of the member 10. This member 10 is attached by means of a bolt 14 to the cross piece 11 of the connecting piece 13 fixed to the sled itself by means of the screws 12. The member 10 is provided with a bottom flange 10' on which is mounted one cooperating section of the ball joint. The member 10 can rotate about the axis of the bolt 14. Owing to the ball joint 8 the chassis 1 is free to make any movement with regard to the sled 7, viz: the chassis 1, unimpeded by the sled, may move up- and downwards and rotate about the longitudinal axis A—A of the sled. These motions allow the rubber tires 2 to follow exactly the ground along which they run, i. e. they always guarantee a good contact between the tires and the ground. Besides, the ball joint 8 allows of a side slipping of the chassis. This, to a certain degree, may be advantageous in a curve, however, not on a straight road where this side slipping should be avoided. This side slipping is prevented by two pressure springs 15 secured to the cross piece 9 by means of the screws 16 and to the member 10 by the screws 17. These springs prevent side slipping on a straight road, but permit of the same to any degree desired in a curve. As these springs 15 are positioned above the joint 8, they exert a turning movement on the chassis, thereby assisting the weight of the chassis so that the contact between ground and tires is improved. The screws 16 are formed as adjusting screws so that, by changing the initial tension in the springs, the contact pressure between tires and ground can be varied. In order that the rotative motion of the chassis about the axis A—A of the sled may not be hindered by the springs 15, the member 10, as above described, is arranged pivotally about the axis of the bolt 14.

In the embodiment shown in Figs. 2 and 3 the cross piece 18 of the chassis 1 is connected with the cross piece 21 of the sled 7 itself by means of hinges 20. These hinges allow the chassis 1 to move up and down unimpeded by the sled. Rotation about the longitudinal axis A—A (Fig. 3) of the sled is rendered possible by the cross piece 23 of the hinges 20 connected with the sled cross piece 21 by means of the bolt 24. Side slipping of the chassis with regard to the sled is, in this example, impossible. As in Fig. 1 the springs 15 also improve the contact between ground and tires here. The initial tension of the springs can be adjusted by means of the screws 16.

In the example represented in Figs. 4 and 5 the coupling between the chassis 1 and the sled 7 itself is still more simple. Bolts 26 are fixed to the cross piece 25 of the sled 7, which, at their upper free end are interconnected by a plate 27. This latter can be moved along the bolts 26. The cross piece 28 of the chassis 1 has a flange 29. Pressure springs 30 are supported on this flange and on the plate 27. The cross pieces 28 and 25 are interconnected by a bolt 31 in such a way that the cross piece 28 and with it the chassis 1 can rotate about the longitudinal sled axis A—A. The bolt 31 goes through a slot 32 of the cross piece 25 of the sled 7. In this way up and down movement of the chassis is guaranteed unimpeded by the sled. As may be seen from the drawing, here too, the springs 30 improve the contact between the ground and the tires. Side slipping of the chassis is prevented by the bolt 31 and the two cross pieces 25 and 28.

Figs. 4 and 5, together with Figs. 6 and 7 illustrate an embodiment in which the sled can be converted into a rolling vehicle to run on snow-free roads. A cranked wheel axle 33 is pivotally mounted on the fore skid runner portion 35 of the sled 7. The tires 41 are mounted for free rotation on the stub shafts 34 of the axle 33. As will be observed from an inspection of Fig. 7 a rack 36 is mounted vertically slidable on the fore skid runner portion of the sled 7. This rack engages two toothed wheels. One of such wheels or pinions, namely, pinion 37, is keyed or otherwise affixed to shaft 38, which shaft is journaled for rotation in bearings mounted on the frame of sled 7 while the other toothed wheel or pinion is keyed to the axle 33. A lever 40 is fastened to the shaft 38. As this lever is turned into the position shown in Fig. 6 in dotted lines, the rack 36 moves upwards. The toothed wheel 39, seen in Fig. 6, rotates in the clockwise direction and the tires are lifted, until they lie above the running plane B—B of the fore skid runners 35. Figs. 6 and 7 show the rack and the tires 2 in their lowest position where they are supported on the ground 42, the runners thereby being lifted so that the sled is converted into a rolling vehicle. As will be appreciated, depression of the ground wheels 41 to the ground engaging position shown in Figs. 6 and 7 serves to elevate the front end of the frame 7 of the sled. This elevation of the frame correspondingly elevates runners 35. It is necessary to maintain clearance between rear runner 43 (Fig. 4) and the ground. For this purpose a pull member is used. This member 44, e. g. a rope or a chain, is fixed at the one end of the flange 29 and runs over a roller 45 or an axle of the kind-runner portion of the sled, e. g., to any suitable take up mechanism. If the pull member 44, e. g. a rope, is thus taken up, the hind-runner portion of the sled 7 is lifted and the vehicle is ready for a rolling run. This movement is permitted by reason of the pin and slot connection 31—32. In this position the weight of the sled is ultimately sustained by the ground wheels 41 and the flange 29 by reason of the bearing of springs 30 thereon.

The chassis as well as the sled itself may have more than two wheels. Other wheels than rubber tires might be used. Threaded spindles and rods with ball joints or a rack and toothed wheels as shown in Figs. 6 and 7 might be used in Figs. 4 and 5 in place of the member 44. On the hind runner portion wheels according to Figs. 6 and 7 might be provided so that a pull member can be omitted. Anyhow, the single parts may undergo various changes without exceeding the scope of the invention.

What I claim is:

1. A motor driven sled, comprising, in combination, a front sled member, a coupling plate on the rear of the sled, a separate motor chassis mounted behind the sled, a coupling plate on the motor chassis, coupling means associated with the coupling plates of the sled and chassis and cooperating to effect coupling the sled and the motor chassis, and a rotatable coupling plate rotatably secured to the sled coupling plate and secured to the motor chassis-coupling plate by spring members.

2. A motor driven sled comprising, in combination, a front sled member, a coupling plate fixed on the rear of the sled, a second plate rotatably attached to said coupling plate, a separate motor chassis mounted behind the sled, a frame plate attached to the motor chassis, coacting coupling means carried by the said frame plate and rotatable plate adapted to connect the motor chassis and sled member said coacting coupling means being adapted to permit relative vertical movement of the said sled and chassis.

3. A construction in accordance with claim 1 in which the coupling means comprises a ball and socket joint and the said spring means are positioned vertically above the ball and socket joint to thereby apply traction to the motor chassis.

4. A motor driven sled comprising, in combination, a front sled member, a fixed coupling plate on the rear of the sled, a second coupling plate mounted on the fixed coupling plate for relative rotation thereto, a separate motor chassis mounted behind the sled, a frame plate on the motor chassis, a coupling means comprising a ball attached to the frame plate and a socket carried by the said rotatable plate coacting to couple the motor chassis and sled, and tension springs secured to the said rotatable plate and said fixed frame member laterally of the vertical axis of said ball and socket joint.

MARTIN SCHMID.

REFERENCES CITED

The following references are of record in the file of this patent:

UNITED STATES PATENTS

| Number | Name | Date |
|---|---|---|
| 1,217,191 | Lakso | Feb. 27, 1917 |
| 1,637,533 | Pearson | Aug. 2, 1927 |
| 1,682,051 | Pearson | Aug. 28, 1928 |
| 2,289,768 | Fehrenbacher | July 14, 1942 |